(12) United States Patent
Yamamoto et al.

(10) Patent No.: US 10,862,132 B2
(45) Date of Patent: Dec. 8, 2020

(54) RECHARGEABLE BATTERY AND METHOD OF PRODUCING THE SAME

(71) Applicant: TOYOTA JIDOSHA KABUSHIKI KAISHA, Toyota (JP)

(72) Inventors: Kunimitsu Yamamoto, Toyota (JP); Tsuyoshi Sasaki, Nagakute (JP); Chikaaki Okuda, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 19 days.

(21) Appl. No.: 16/197,998

(22) Filed: Nov. 21, 2018

(65) Prior Publication Data

US 2019/0198883 A1 Jun. 27, 2019

(30) Foreign Application Priority Data

Dec. 27, 2017 (JP) .................. 2017-251798

(51) Int. Cl.
| | |
|---|---|
| *H01M 4/78* | (2006.01) |
| *H01M 10/0583* | (2010.01) |
| *H01M 4/136* | (2010.01) |
| *H01M 10/0525* | (2010.01) |
| *H01M 4/04* | (2006.01) |

(Continued)

(52) U.S. Cl.
CPC ........... *H01M 4/78* (2013.01); *H01M 4/0404* (2013.01); *H01M 4/0416* (2013.01); *H01M 4/131* (2013.01); *H01M 4/133* (2013.01); *H01M 4/136* (2013.01); *H01M 4/1391* (2013.01); *H01M 4/1393* (2013.01); *H01M 4/808* (2013.01); *H01M 10/058* (2013.01); *H01M 10/0525* (2013.01); *H01M 10/0583* (2013.01); *H01M 2004/025* (2013.01); *H01M 2220/20* (2013.01)

(58) Field of Classification Search
None
See application file for complete search history.

(56) References Cited

U.S. PATENT DOCUMENTS

| | | |
|---|---|---|
| 5,563,006 A | 10/1996 | Von Benda et al. |
| 2004/0139587 A1 | 7/2004 | Sato et al. |

(Continued)

FOREIGN PATENT DOCUMENTS

| | | |
|---|---|---|
| JP | H07-263025 A1 | 10/1995 |
| JP | WO2002/093678 A1 | 9/2004 |

(Continued)

OTHER PUBLICATIONS

Rhodes et al., "Architectural integration of the components necessary for electrical energy storage on the nanoscale and in 3D", Jan. 2011, Nanoscale, 3, 1731-1740 (Year: 2011).*

(Continued)

*Primary Examiner* — Daniel S Gatewood
(74) *Attorney, Agent, or Firm* — Oliff PLC (57) ABSTRACT

A rechargeable battery includes at least a porous base, a first electrode layer, an ionic conductor layer, and a second electrode layer. The porous base includes a conductive framework. The framework has a three-dimensional network structure. On at least part of a surface of the framework in the interior of the porous base, the first electrode layer, the ionic conductor layer, and the second electrode layer are stacked in this order. The first electrode layer and the second electrode layer have opposite polarities.

14 Claims, 4 Drawing Sheets

(51) Int. Cl.
  *H01M 4/133*   (2010.01)
  *H01M 4/1393*  (2010.01)
  *H01M 4/131*   (2010.01)
  *H01M 4/80*    (2006.01)
  *H01M 10/058*  (2010.01)
  *H01M 4/1391*  (2010.01)
  *H01M 4/02*    (2006.01)

(56) References Cited

U.S. PATENT DOCUMENTS

| | | | |
|---|---|---|---|
| 2013/0084501 A1 | 4/2013 | Wakayama et al. | |
| 2013/0196235 A1* | 8/2013 | Prieto | H01M 4/0452 |
| | | | 429/315 |
| 2013/0266856 A1* | 10/2013 | Ryhanen | H01M 10/04 |
| | | | 429/211 |

FOREIGN PATENT DOCUMENTS

| | | |
|---|---|---|
| JP | 2013-077563 A | 4/2013 |
| JP | 2017-004706 A | 1/2017 |
| KR | 2014-0082958 A | 7/2014 |

OTHER PUBLICATIONS

Christopher P. Rhodes et al. "Architectural Integration of the Components Necessary for Electrical Energy Storage on the Nanoscale and in 3D". Nanoscale, vol. 3, No. 4, Feb. 16, 2011, p. 1731-1740.

Christopher P. Rhodes et al. "Nanoscale Polymer Electrolytes: Ultrathin Electrodeposited Poly(Phenylene Oxide) With Solid-State Ionic Conductivity". Journal of Physical Chemistry Part B: Condensed Matter, Materials, Surfaces, Interfaces & Biophysical, vol. 108, No. 35, Aug. 11, 2004, pp. 13079-13087.

Stefania Ferrari et al. "Latest Advances in the Manufacturing of 3D Rechargeable Lithium Microbatteries". Journal of Power Sources, vol. 286, 2015, pp. 25-46.

* cited by examiner

RECHARGEABLE BATTERY AND METHOD OF PRODUCING THE SAME

This nonprovisional application is based on Japanese Patent Application No. 2017-251798 filed on Dec. 27, 2017 with the Japan Patent Office, the entire contents of which are hereby incorporated by reference.

BACKGROUND

Field

The present disclosure relates to a rechargeable battery and a method of producing the same.

Description of the Background Art

Studies have been conducted on rechargeable batteries having a three-dimensional (cubic) electrode structure (so-called "three-dimensional batteries").

SUMMARY

Figure 1:
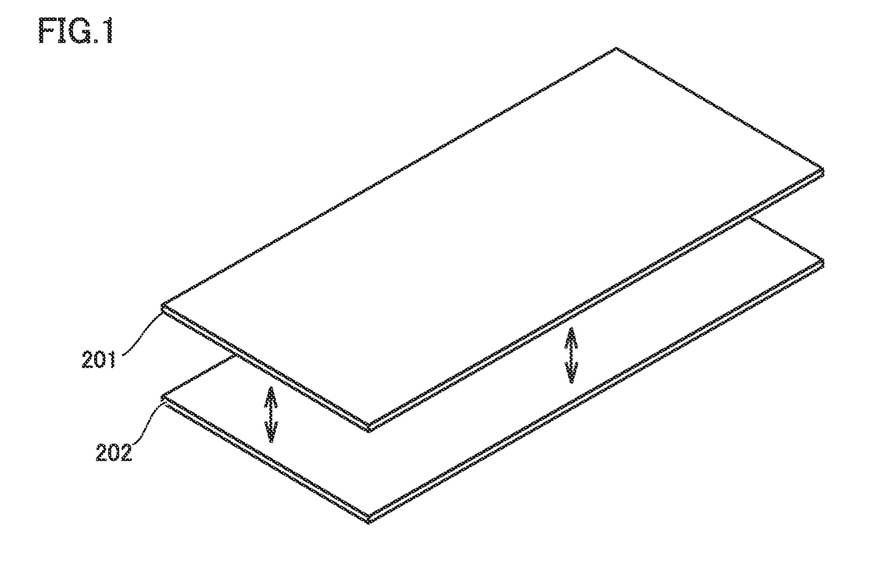
FIG. 1 is a conceptual view that illustrates a two-dimensional electrode structure.

FIG. 1 is a conceptual view that illustrates a two-dimensional electrode structure. Conventional rechargeable batteries have a two-dimensional (planar) electrode structure. More specifically, such batteries have a planar positive electrode 201 and a planar negative electrode 202 facing each other.

As for a rechargeable battery having such a two-dimensional electrode structure, in order to increase the energy density per volume (namely, the amount of power storable per unit volume), it is necessary to increase the thicknesses of the electrodes so as to make other components (such as a current collector) relatively thin. However, it is considered that the thicker the electrodes are, the lower the output is. The reason is considered to be that when the electrodes are thick, the influence of the velocity of charge carriers travelling within a thickness direction of the electrodes on the output is great. In other words, in the two-dimensional electrode structure, there is a trade-off between the energy density per volume and the output. There is a demand for an innovative technique capable of solving this trade-off.

Figure 2:
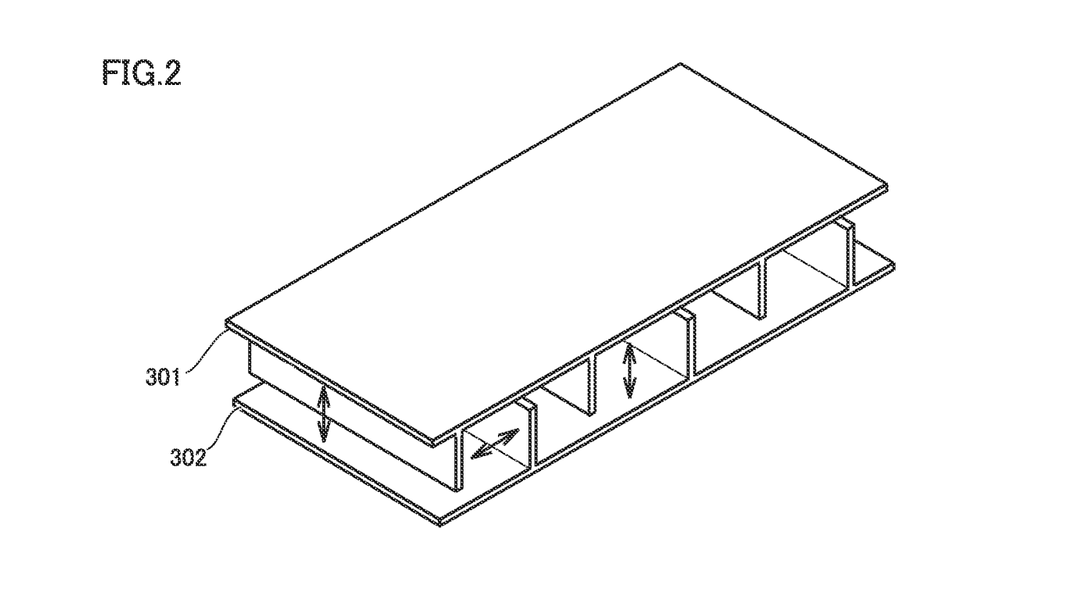
FIG. 2 is a conceptual view that illustrates a three-dimensional electrode structure.

FIG. 2 is a conceptual view that illustrates a three-dimensional electrode structure.

Ferrari et al. disclose a three-dimensional battery (S. Ferrari et al., "Latest advances in the manufacturing of 3D rechargeable lithium microbatteries", Journal of Power Sources, Volume 286, 2015, Pages 25-46). The three-dimensional battery disclosed by Ferrari et al. has a structure in which a comblike positive electrode 301 is engaged with a comblike negative electrode 302, for example. It is expected that this arrangement of the positive electrode and the negative electrode placed cubically adjacent to each other increases the area of reaction (area of facing) per unit volume and shortens the distance that charge carriers travel. In such a three-dimensional battery, a high energy density per volume and a high output are both expected to be obtained. However, the three-dimensional battery disclosed by Ferrari et al. is of the micrometer-scale.

An object of the present disclosure is to provide a three-dimensional battery that can be of the centimeter-scale or larger.

In the following, the technical structure and the effects according to the present disclosure are described. It should be noted that part of the action mechanism according to the present disclosure is based on presumption. Therefore, the scope of claims should not be limited by whether or not the action mechanism is correct.

[1] A rechargeable battery according to the present disclosure includes at least a porous base, a first electrode layer, an ionic conductor layer, and a second electrode layer. The porous base includes a framework that is conductive. The framework has a three-dimensional network structure. On at least part of a surface of the framework in the interior of the porous base, a first electrode layer, an ionic conductor layer, and a second electrode layer are stacked in this order. The first electrode layer and the second electrode layer have opposite polarities.

The framework, which is the base of the electrode structure of the rechargeable battery according to the present disclosure, has a three-dimensional network structure. On a surface of the framework, the first electrode layer, the ionic conductor layer, and the second electrode layer are stacked in this order. Therefore, it is considered that each of the first electrode layer, the ionic conductor layer, and the second electrode layer has a three-dimensional network structure. It is considered that because of these structures, the first electrode layer and the second electrode layer are cubically adjacent to each other. In other words, it is considered that the rechargeable battery according to the present disclosure is a three-dimensional battery.

The framework is conductive. In addition, the framework can function as a current collector of the first electrode layer. When the framework functions as a current collector, the current-collecting structure can be simple. Having a simple current-collecting structure means having a small number of parts other than the electrodes. It is expected that having a small number of parts other than the electrodes, the rechargeable battery has a large space for the electrodes to occupy.

The first electrode layer and the second electrode layer are separated from each other by the ionic conductor layer. The ionic conductor layer is a layer responsible for ion conduction between the first electrode layer and the second electrode layer. The ionic conductor layer may contain a solid electrolyte, for example. The ionic conductor layer may contain a gelled electrolyte, for example.

As described below in the examples according to the present disclosure, a three-dimensional battery that can be of the centimeter-scale or larger can be provided by the structure of [1] above.

The space expressed as "the interior of the porous base" refers to a stretch of space that is closer to the geometric center of the porous base than the outer surface of the porous base.

The "three-dimensional network structure" refers to a structure that satisfies at least the following conditions (i) and (ii): (i) the structure extends in at least three directions in a three-dimensional space; and (ii) there is no single plane on which all these directions can lie.

[2] The rechargeable battery according to the present disclosure may further include a liquid electrolyte. Each of the first electrode layer and the second electrode layer may be porous. The ionic conductor layer may contain a gelled electrolyte. The liquid electrolyte may have penetrated the first electrode layer, the gelled electrolyte, and the second electrode layer.

It is expected that the velocity of charge carriers travelling within the liquid electrolyte is high. When the liquid electrolyte is distributed across the electrode structure, an improved output is expected to be obtained.

The gelled electrolyte may be formed by making a liquid electrolyte (guest) penetrate a polymer material (host) and thereby making the polymer material swell. The gelled electrolyte may be flexible and elastic. It is considered that the first electrode layer and the second electrode layer expand and shrink as charge and discharge progress. It is considered that the gelled electrolyte can undergo deformation according to such volume changes of the first electrode layer and the second electrode layer. It is expected that when the ionic conductor layer contains the gelled electrolyte, a stable interconnection is obtained between the first electrode layer, the ionic conductor layer, and the second electrode layer. It is also considered that when the ionic conductor layer contains the gelled electrolyte, the strain generated by the volume changes of the first electrode layer and the second electrode layer can be released. It is expected that these phenomena improve cycle durability, for example.

[3] Each of the first electrode layer and the second electrode layer may be a fixed layer.

The "fixed layer" refers to a layer fixed to a support. The first electrode layer may be fixed to a surface of the framework (support). The second electrode layer may be fixed to a surface of the ionic conductor layer (support). Each of the first electrode layer and the second electrode layer may be made to adhere to the support by, for example, a binder contained in the layer. The binder may have the function of making the constituents of the first electrode layer and the second electrode layer, respectively, adhere to each other. The constituents of the first electrode layer and the second electrode layer refer to a positive electrode active material (or a negative electrode active material), a conductive material, and a solid electrolyte, for example.

When the first electrode layer and the second electrode layer are fixed layers, compared to the state in which the first electrode layer and the second electrode layer are movable, the first electrode layer and the second electrode layer are expected to have high filling factors. In other words, an improved energy density per volume is expected to be obtained.

[4] In a cross section in which the framework surrounds the second electrode layer, the first electrode layer and the ionic conductor layer may surround the second electrode layer.

In this configuration, pores in the interior of the porous base may be filled with the first electrode layer, the ionic conductor layer, and the second electrode layer with no gap remaining. It is expected that as a result, an improved energy density per volume is obtained.

[5] The second electrode layer may be exposed on part of an outer surface of the porous base.

It is considered that by bonding a current collector component (such as a current collector tab) to the exposed portion of the second electrode layer, currents can be collected from the entire second electrode layer. In other words, an even simpler current-collecting structure is considered to be obtained.

[6] The rechargeable battery according to the present disclosure may be a lithium-ion rechargeable battery.

The present disclosure can provide a lithium-ion rechargeable battery that is a three-dimensional battery and has a practical level of capacity.

[7] The three-dimensional network structure may be a gyroid structure.

[8] The three-dimensional network structure may be an inverse-opal structure.

[9] A method of producing a rechargeable battery according to the present disclosure includes at least the following (A) and (B):

(A) preparing a porous base, the porous base including a framework that is conductive, the framework having a three-dimensional network structure; and (B) on at least part of a surface of the framework in the interior of the porous base, stacking the first electrode layer, the ionic conductor layer, and the second electrode layer in this order.

The first electrode layer and the second electrode layer have opposite polarities.

By this production method, the rechargeable battery described in any one of [1] to [8] above may be produced.

The foregoing and other objects, features, aspects and advantages of the present disclosure will become more apparent from the following detailed description of the present disclosure.

DESCRIPTION OF THE PREFERRED EMBODIMENTS

In the following, embodiments according to the present disclosure (herein called "present embodiment") are described. The scope of claims is not limited to the following description. For example, although the following description is mainly on applications to lithium-ion rechargeable batteries, the rechargeable battery according to the present embodiment is not limited to a lithium-ion rechargeable battery. The present embodiment may also be applied to sodium-ion rechargeable batteries and alkaline rechargeable batteries, for example.

<Rechargeable Battery>

Figure 3:
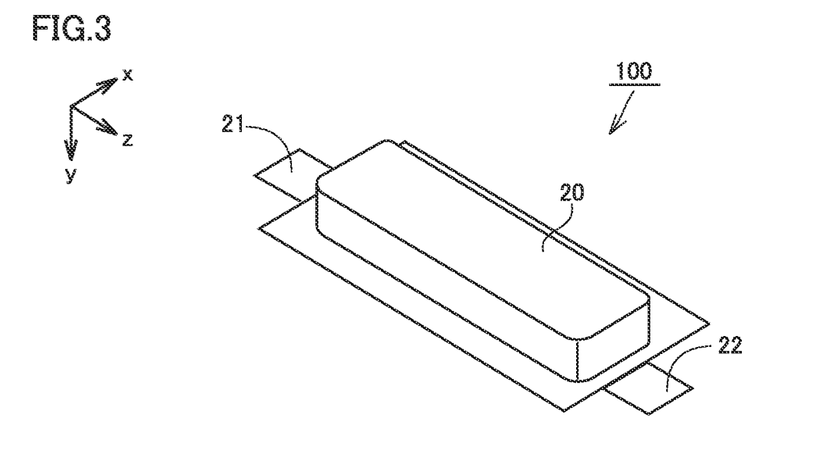
FIG. 3 is a schematic view illustrating the structure of the rechargeable battery according to the present embodiment.

FIG. 3 is a schematic view illustrating the structure of the rechargeable battery according to the present embodiment.

A rechargeable battery 100 is a lithium-ion rechargeable battery (also called "lithium-ion secondary battery"). More specifically, rechargeable battery 100 is a lithium battery adopted to recharge.

Rechargeable battery 100 includes a housing 20. The material and the shape of housing 20 are not particularly limited. Housing 20 may be, for example, a pouch made of an Al-laminated film or the like. Housing 20 may be, for example, a container made of metal, resin, or the like. Housing 20 may have a flat profile or a cylindrical profile or may be a rectangular parallelepiped, for example.

Figure 4:
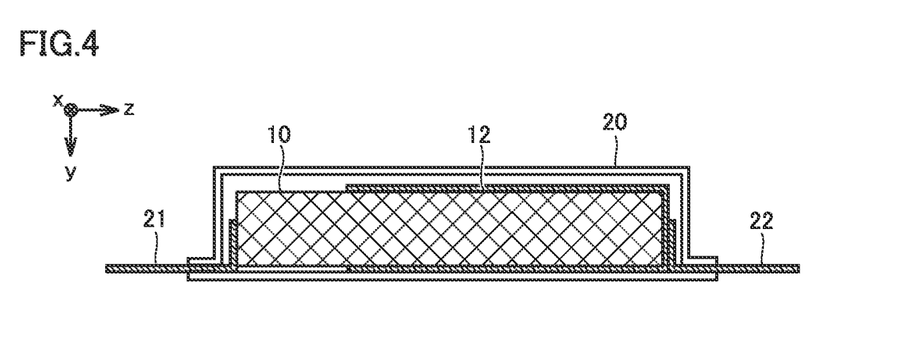
FIG. 4 is a schematic cross-sectional view illustrating the structure of the rechargeable battery according to the present embodiment.

FIG. 4 is a schematic cross-sectional view illustrating the structure of the rechargeable battery according to the present embodiment.

Housing 20 accommodates a porous base 10. To porous base 10, a first current collector tab 21 and a second current collector tab 22 are connected. First current collector tab 21 and second current collector tab 22 protrude from housing 20. Each of first current collector tab 21 and second current collector tab 22 may function as an external terminal. Each of first current collector tab 21 and second current collector tab 22 may be, for example, a thin plate made of metal or the like.

On part of an outer surface of porous base 10, a second electrode layer 12 (described below) may be exposed. When second current collector tab 22 is bonded to the exposed portion of second electrode layer 12, a simple current-collecting structure may be formed. Desirably in this case, second electrode layer 12 contains an active material with excellent conductivity. It is considered that the active material with excellent conductivity is graphite, for example. Second electrode layer 12 may be directly bonded to second current collector tab 22. Between second electrode layer 12 and second current collector tab 22, a metal film (not shown) may be formed.

<<Porous Base>>

The outer profile of porous base 10 is not particularly limited. Porous base 10 may have a prismatic profile, a rectangularly parallelepipedic profile, a cylindrical profile, a sheet-like profile, or a disc-like profile, for example.

Figure 5:
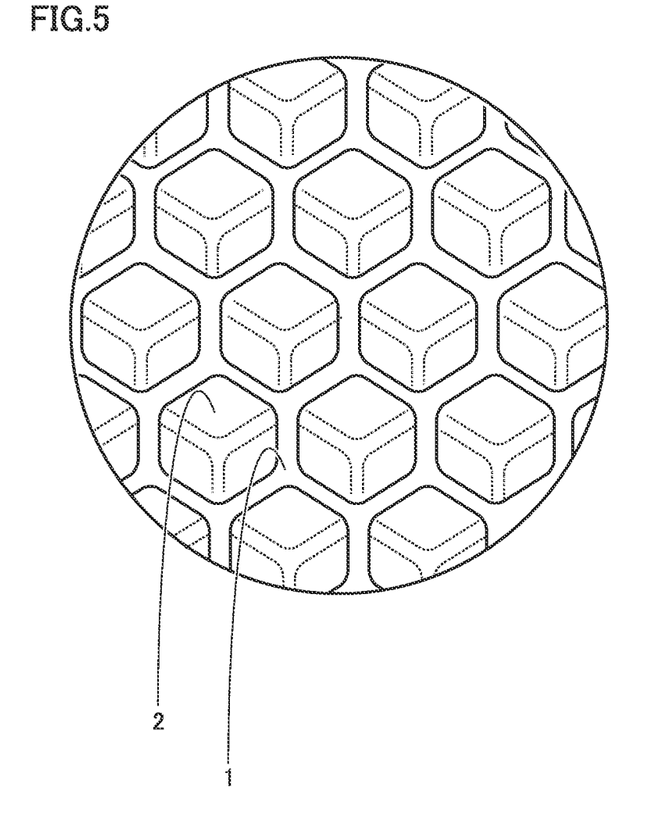
FIG. 5 is a conceptual view illustrating the framework.

FIG. 5 is a conceptual view illustrating a framework.

Porous base 10 includes a framework 1. Framework 1 is the base of the electrode structure. Framework 1 has a three-dimensional network structure. It is considered that framework 1 is formed continuously across porous base 10. The three-dimensional network structure may be a regular structure. The three-dimensional network structure may be an irregular structure. Framework 1 may be fibrous. Framework 1 may be curvy. Framework 1 may have a gyroid structure, for example. In other words, the three-dimensional network structure may be a gyroid structure. Framework 1 may have an inverse-opal structure, for example. In other words, the three-dimensional network structure may be an inverse-opal structure.

Framework 1 is conductive. The expression "the framework is conductive" refers to the following: framework 1 is made of a material that has a resistance not higher than $10^{-3}$ $\Omega \cdot m$ at a temperature within a range not lower than 0° C. and not higher than 25° C. The resistance of the material may be a value specified in a document, such as a value specified in "*Kagaku Binran* (Handbook of Chemistry) (edited by The Chemical Society of Japan, issued by Maruzen Publishing, Co., Ltd.)", for example.

Framework 1 may be made of a metal, for example. Porous base 10 may be foam metal, for example. The metal may be aluminum (Al), copper (Cu), and/or nickel (Ni), for example. Framework 1 may be made of a conductive carbon, for example. The conductive carbon may be graphite, for example. Framework 1 may be solid. Framework 1 may be hollow.

The portion of porous base 10 that is not occupied by framework 1 is occupied by pores 2. Porous base 10 may have a porosity not lower than 25% and not higher than 75%, for example. The porosity refers to a volume ratio of pores in porous base 10. The porosity is calculated by the following expression:

Porosity={1−((apparent specific gravity of porous base)/(true specific gravity of material of porous base))}×100.

The apparent specific gravity refers to a value of specific gravity calculated from the outer dimensions of porous base 10.

Pores 2 may be formed continuously across porous base 10. In other words, pores 2 may be a continuous pore. The shape of pores 2 is not particularly limited. The shape of pores 2 may be random.

Pores 2 may have an average diameter not smaller than 50 µm and not greater than 1000 µm, for example. The average diameter of pores 2 is measured as follows. The number of pores 2 per unit length of an outer surface of porous base 10 is counted. The reciprocal of the resulting number of pores 2 per unit length is used as the average diameter of pores 2. The average diameter is measured at least three times. The arithmetic mean of these at least three measurements is used.

Figure 6:
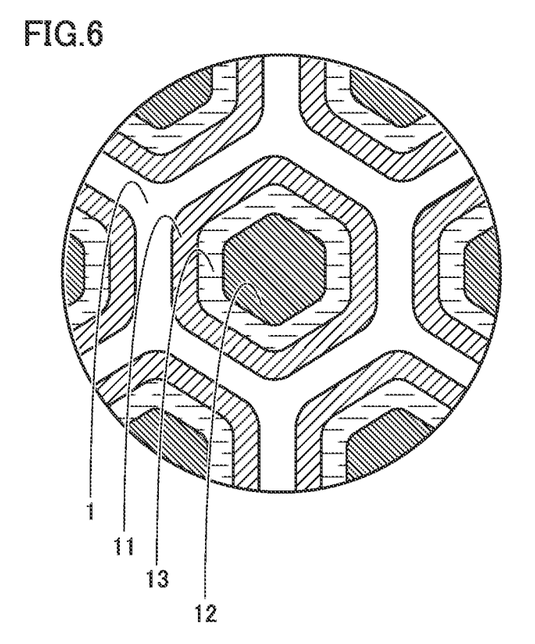
FIG. 6 is a conceptual cross-sectional view illustrating the electrode structure.

FIG. 6 is a conceptual cross-sectional view illustrating the electrode structure.

On at least part of a surface of framework 1 in the interior of porous base 10 according to the present embodiment, a first electrode layer 11, an ionic conductor layer 13, and second electrode layer 12 are stacked in this order. First electrode layer 11 and second electrode layer 12 are separated from each other by ionic conductor layer 13.

First electrode layer 11, ionic conductor layer 13, and second electrode layer 12 may be formed all over the interior of porous base 10. The volume of space available for formation of the electrode structure may be changed, as appropriate, according to the specification of rechargeable battery 100.

It is considered that first electrode layer 11, ionic conductor layer 13, and second electrode layer 12 are formed along a surface of framework 1. Therefore, it is considered that each of first electrode layer 11, ionic conductor layer 13, and second electrode layer 12 has a three-dimensional network structure. It is expected that this arrangement of first electrode layer 11 and second electrode layer 12 placed cubically adjacent to each other increases the area of reaction per unit volume and shortens the distance that charge carriers travel. Therefore, a high energy density per volume and a high output are both expected to be obtained.

Charge carriers according to the present embodiment are lithium ions. The charge carriers move within ionic conductor layer 13 travelling between first electrode layer 11 and second electrode layer 12.

Desirably, each of first electrode layer 11, ionic conductor layer 13, and second electrode layer 12 is continuous across its entire stretch. More specifically, it is desirable that each of first electrode layer 11, ionic conductor layer 13, and second electrode layer 12 have substantially no isolated portion. However, as long as charge and discharge of rechargeable battery 100 are possible, any of first electrode layer 11, ionic conductor layer 13, and second electrode layer 12 may be discontinuous.

Framework 1 can function as a current collector of first electrode layer 11. It is considered that when first current collector tab 21 is bonded to part of framework 1 on an outer surface of porous base 10, currents can be collected from the entire first electrode layer 11. In other words, a simple current-collecting structure may be formed.

FIG. 6 shows a cross section in which framework 1 surrounds second electrode layer 12. In the cross section, first electrode layer 11 and ionic conductor layer 13 may surround second electrode layer 12. In this configuration, pores 2 (FIG. 5) may be filled with first electrode layer 11, ionic conductor layer 13, and second electrode layer 12 with no gap remaining. It is expected that as a result, an improved energy density per volume is obtained.

<<First Electrode Layer and Second Electrode Layer>>

Each of first electrode layer 11 and second electrode layer 12 may have a thickness not smaller than 2 μm and not greater than 500 μm, for example. In the present embodiment, the thickness of each of first electrode layer 11, second electrode layer 12, and ionic conductor layer 13 is measured in an image taken by cross-sectional electron microscopy. The direction of thickness from a certain point in first electrode layer 11 is, for example, the direction of the shortest distance between that point and second electrode layer 12 in the cross section of FIG. 6. The thickness of each component is measured at at least three positions. The arithmetic mean of these at least three thickness measurements is used.

Each of first electrode layer 11 and second electrode layer 12 may be porous. When each of first electrode layer 11 and second electrode layer 12 is porous, a liquid electrolyte can penetrate the space inside the layer. In other words, rechargeable battery 100 may further include a liquid electrolyte. When rechargeable battery 100 further includes a liquid electrolyte, an improved output is expected to be obtained. The reason is because the velocity of charge carriers travelling within the liquid electrolyte is expected to be high.

Each of first electrode layer 11 and second electrode layer 12 may have a porosity not lower than 5% and not higher than 50%, for example. Each of first electrode layer 11 and second electrode layer 12 may have a porosity not lower than 15% and not higher than 40%, for example. The porosity of first electrode layer 11 (or second electrode layer 12) in, for example, an image of first electrode layer 11 (or second electrode layer 12) taken by cross-sectional electron microscopy may be calculated as the ratio of the total area of pores 2 to the total area of the image.

When ionic conductor layer 13 contains a solid electrolyte, it is desirable that each of first electrode layer 11 and second electrode layer 12 be dense and, more specifically, it is desirable that each of first electrode layer 11 and second electrode layer 12 may have a porosity lower than 5%, for example.

When ionic conductor layer 13 contains a solid electrolyte, each of first electrode layer 11 and second electrode layer 12 may further contain a solid electrolyte. The solid electrolyte may be in a particle form, for example. The solid electrolyte may have a D50 not lower than 0.1 μm and not higher than 30 μm, for example. The D50 refers to the particle size in volume-based particle size distribution obtained by laser diffraction and scattering at which the cumulative particle volume (accumulated from the side of small sizes) reaches 50% of the total particle volume.

The content of the solid electrolyte in first electrode layer 11 (or second electrode layer 12) may be, for example, not lower than 1 volume % and not higher than 60 volume % relative to the volume of first electrode layer 11 (or second electrode layer 12). The content of the solid electrolyte (volume ratio) in, for example, an image of first electrode layer 11 (or second electrode layer 12) taken by cross-sectional electron microscopy may be calculated as the ratio of the total area of the solid electrolyte to the total area of the image.

Each of first electrode layer 11 and second electrode layer 12 may be a fixed layer. When each of first electrode layer 11 and second electrode layer 12 is a fixed layer, the filling factors of first electrode layer 11 and second electrode layer 12 inside porous base 10 is expected to be high.

First electrode layer 11 and second electrode layer 12 have opposite polarities. More specifically, first electrode layer 11 is a positive electrode and second electrode layer 12 is a negative electrode, or first electrode layer 11 is a negative electrode and second electrode layer 12 is a positive electrode. First electrode layer 11 may be a positive electrode. First electrode layer 11 may be a negative electrode.

Charge carriers (lithium ions) may be provided to rechargeable battery 100 by a positive electrode active material. Alternatively, charge carriers may be provided to rechargeable battery 100 by a negative electrode active material. In other words, before initial charge and discharge, lithium ions may be contained in the positive electrode active material or may be contained in the negative electrode active material.

(Positive Electrode)

A positive electrode includes at least the positive electrode active material. The positive electrode may further include a solid electrolyte, a conductive material, and a binder. The positive electrode active material is typically in a particle form. The positive electrode active material may have a D50 not lower than 1 μm and not higher than 30 μm, for example.

The positive electrode active material is not particularly limited. The positive electrode active material may be a lithium-(transition metal) composite oxide, for example. The lithium-(transition metal) composite oxide may have any of various crystal structures. The lithium-(transition metal) composite oxide may have a crystal structure of a lamellar rock salt type, a spinel type, or an olivine type, for example. The lithium-(transition metal) composite oxide may be $LiCoO_2$, $LiNiO_2$, $LiMnO_2$, $LiMn_2O_4$, $LiNi_{1/3}Co_{1/3}Mn_{1/3}O_2$, $LiNi_{0.8}Co_{0.15}Al_{0.05}O_2$, and/or $LiFePO_4$, for example. One type of the positive electrode active material may be used alone. Two or more types of the positive electrode active material may be used in combination.

The conductive material is not particularly limited. The conductive material may be carbon black, for example. The content of the conductive material in the positive electrode may be, for example, not lower than 1 part by mass and not higher than 20 parts by mass relative to 100 parts by mass of the positive electrode active material. The binder is not particularly limited. The binder may be polyvinylidene difluoride (PVdF), for example. The content of the binder in the positive electrode may be, for example, not lower than 1 part by mass and not higher than 10 parts by mass relative to 100 parts by mass of the positive electrode active material.

(Negative Electrode)

A negative electrode includes at least the negative electrode active material. The negative electrode may further include a solid electrolyte, a conductive material, and a binder. The negative electrode active material is typically in a particle form. The negative electrode active material may have a D50 not lower than 1 μm and not higher than 30 μm, for example.

The negative electrode active material is not particularly limited. The negative electrode active material may be graphite, soft carbon, hard carbon, silicon, silicon oxide, silicon-based alloy, tin, tin oxide, tin-based alloy, and/or $Li_4Ti_5O_{12}$, for example. The graphite may be artificial graphite. The graphite may be natural graphite. One type of the negative electrode active material may be used alone. Two or more types of the negative electrode active material may be used in combination.

The conductive material is not particularly limited. The conductive material may be carbon black, for example. The content of the conductive material in the negative electrode may be, for example, not lower than 1 part by mass and not higher than 10 parts by mass relative to 100 parts by mass of the negative electrode active material. When a negative electrode active material with excellent conductivity (such as graphite) is used, substantially no conductive material may be required.

The binder is not particularly limited. The binder may be carboxymethylcellulose (CMC) and/or styrene-butadiene rubber (SBR), for example. The content of the binder in the negative electrode may be, for example, not lower than 1 part by mass and not higher than 10 parts by mass relative to 100 parts by mass of the negative electrode active material. When ionic conductor layer 13 contains a gelled electrolyte, substantially no binder may be required. The reason is because the negative electrode active material can adhere to the gelled electrolyte (polymer material) to form a fixed layer. The binder tends to have a high resistance. When no binder is used, an improved output is expected to be obtained, for example.

<<Ionic Conductor Layer>>

Ionic conductor layer 13 is interposed between first electrode layer 11 and second electrode layer 12. Ionic conductor layer 13 functions as a partition. More specifically, ionic conductor layer 13 functions as a separator. Ionic conductor layer 13 may have a thickness not smaller than 1 μm and not greater than 50 μm, for example.

(Solid Electrolyte)

Ionic conductor layer 13 may contain a solid electrolyte, for example. Ionic conductor layer 13 may be, for example, a layer substantially consisting of the solid electrolyte. Ionic conductor layer 13 may further contain, for example, a binder in addition to the solid electrolyte. The binder may be a material that is described above as a binder of the positive electrode and/or the negative electrode.

The solid electrolyte is not particularly limited. The solid electrolyte may be an oxide-based solid electrolyte, for example. The solid electrolyte may be $LiNbO_3$, $Li_3BO_3$, $LiBO_2$, $Li_2O-B_2O_3-ZnO$, $LiAlO_2$, $Li_4SiO_4-Li_3PO_4$, $Li_2O-SiO_2$, $Li_2SiO_3$, $Li_3PO_4$, $Li_3PO_4N$, $Li_2SO_4$, $Li_{0.5}La_{0.5}TiO_3$, $Li_5La_3Ta_2O_{12}$, $Li_2ZrO_3$, $Li_7La_3Zr_2O_{12}$, $Li_2MoO_4$, and/or $Li_2WO_4$, for example.

The solid electrolyte may be a sulfide-based solid electrolyte, for example. The solid electrolyte may be $Li_2S-P_2S_5$, $Li_2S-P_2S_5-LiI$, $Li_2S-P_2S_5-LiCl$, $Li_2S-P_2S_5-LiBr$, $Li_2S-P_2S_5-Li_2O$, $Li_2S-P_2S_5-Li_2O-LiI$, $Li_2S-SiS_2$, $Li_2S-SiS_2-LiI$, $Li_2S-SiS_2-LiBr$, $Li_2S-SiS_2-LiCl$, $Li_2S-SiS_2-B_2S_3-LiI$, $Li_2S-B_2S_3$, $Li_2S-GeS_2$, $Li_2S-SiS_2-Li_3PO_4$, and/or $Li_{10}GeP_2S_{12}$, for example.

One type of the solid electrolyte may be used alone. Two or more types of the solid electrolyte may be used in combination. As described above, the solid electrolyte mentioned here may be contained in first electrode layer 11 and second electrode layer 12.

(Gelled Electrolyte)

Ionic conductor layer 13 may contain a gelled electrolyte. Ionic conductor layer 13 may be, for example, a layer substantially consisting of the gelled electrolyte. Ionic conductor layer 13 may include, for example, both the gelled electrolyte and the solid electrolyte.

The gelled electrolyte contains a polymer material and a liquid electrolyte. The gelled electrolyte may be formed by making a liquid electrolyte (guest) penetrate a polymer material (host) and thereby making the polymer material swell. The gelled electrolyte may be both flexible and elastic. It is expected that when ionic conductor layer 13 contains the gelled electrolyte, a stable interconnection is obtained between first electrode layer 11, ionic conductor layer 13, and second electrode layer 12. It is also considered that when the ionic conductor layer contains the gelled electrolyte, the strain generated by the volume changes of first electrode layer 11 and second electrode layer 12 can be released. It is expected that these phenomena improve cycle durability, for example.

The polymer material is not particularly limited as long as it absorbs the liquid electrolyte and thereby forms gel. The polymer material may be polyethylene glycol (PEG), polyethylene oxide (PEO), polyvinyl alcohol (PVA), polymethyl methacrylate (PMMA), polyacrylic acid (PAA), polyacrylonitrile (PAN), PVdF, and/or vinylidene fluoride-hexafluoropropene copolymer (PVdF-HFP), for example. One type of the polymer material may be used alone. Two or more types of the polymer material may be used in combination.

The polymer material may have crosslinks. More specifically, the polymer material may be a polymer matrix material. When the polymer material is a polymer matrix material, improvement is expected to be obtained in properties of the gelled electrolyte, such as elasticity and liquid-retention ability.

(Liquid Electrolyte)

Rechargeable battery 100 may further include a liquid electrolyte. When first electrode layer 11 and second electrode layer 12 are porous and ionic conductor layer 13 contains the gelled electrolyte, the liquid electrolyte can penetrate first electrode layer 11, ionic conductor layer 13, and second electrode layer 12. When the liquid electrolyte is distributed across the electrode structure, an improved output is expected to be obtained. The liquid electrolyte may be an electrolyte solution, for example. The liquid electrolyte may be an ionic liquid, for example.

The electrolyte solution is a solution of an electrolyte. The electrolyte solution contains a solvent and a supporting salt. The solvent is not particularly limited. The solvent may be ethylene carbonate (EC), propylene carbonate (PC), dimethyl carbonate (DMC), ethyl methyl carbonate (EMC), diethyl carbonate (DEC), acetonitrile (AN), N,N-dimethylformamide (DMF), 1,2-dimethoxyethane (DME), and/or dimethyl sulfoxide (DMSO), for example. One type of the solvent may be used alone. Two or more types of the solvent may be used in combination.

The electrolyte solution may contain the supporting salt in an amount not lower than 0.5 mol/l and not higher than 5 mol/l, for example. The supporting salt is not particularly limited. The supporting salt may be $LiPF_6$, $LiBF_4$, and/or $LiN(SO_2F)_2$, for example. One type of the supporting salt may be used alone. Two or more types of the supporting salt may be used in combination. The electrolyte solution may further contain various additives.

<Method of Producing Rechargeable Battery>

Figure 7:
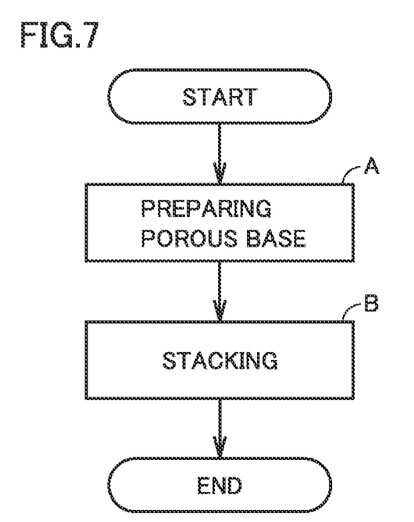
FIG. 7 is a flow chart schematically showing the method of producing a rechargeable battery according to the present embodiment.

FIG. 7 is a flow chart schematically showing the method of producing a rechargeable battery according to the present embodiment.

The method of producing a rechargeable battery according to the present embodiment includes at least "(A) preparation of a porous base" and "(B) stacking".

<<(A) Preparation of Porous Base>>

The method of producing a rechargeable battery according to the present embodiment includes preparing porous base 10. Porous base 10 is described above in detail. More specifically, porous base 10 includes framework 1 that is conductive. Framework 1 has a three-dimensional network structure.

Porous base 10 may be prepared by purchasing a commercially available product or by producing porous base 10. Production of porous base 10 may be carried out by, for example, blowing a metal into foam. Alternatively, for example, plating may be carried out to make a metal adhere to a porous resin, and after the metal adhesion, heat treatment may be carried out for removal of the porous resin so as to produce metal-based porous base 10.

To porous base 10, first current collector tab 21 may be bonded prior to formation of first electrode layer 11 and/or the like. Bonding first current collector tab 21 to porous base 10 may be carried out by welding, for example.

<<(B) Stacking>>

The method of producing a rechargeable battery according to the present embodiment includes stacking first electrode layer 11, ionic conductor layer 13, and second electrode layer 12 in this order on at least part of a surface of framework 1 in the interior of porous base 10. As described above, first electrode layer 11 and second electrode layer 12 have opposite polarities.

1. Case in which Ionic Conductor Layer Contains Solid Electrolyte

When ionic conductor layer 13 contains the solid electrolyte, rechargeable battery 100 may be produced by the following production method, for example.

First electrode layer 11 and ionic conductor layer 13 may be sequentially formed by dipping, for example. The dipping refers to a method of forming a coating layer on a surface of a work (coating subject) by dipping the work in a coating liquid and then lifting the work from the coating liquid, followed by drying.

For example, a positive electrode active material (or a negative electrode active material), a conductive material, a solid electrolyte, a binder, a solvent, and the like are mixed to prepare a first electrode suspension. The solvent may be selected as appropriate depending on the types of the positive electrode active material (or the negative electrode active material), the solid electrolyte, and/or the binder, for example. The first electrode suspension is a precursor of first electrode layer 11. The suspension is sometimes called "slurry".

In the first electrode suspension, porous base 10 is dipped. Porous base 10 is lifted from the first electrode suspension. The first electrode suspension adhering to porous base 10 is dried. Thus, first electrode layer 11 may be formed. It is considered that first electrode layer 11 is stacked on a surface of framework 1.

A solid electrolyte, a binder, and a solvent are mixed to prepare a solid electrolyte suspension. The resulting solid electrolyte suspension is a precursor of ionic conductor layer 13. In this solid electrolyte suspension, porous base 10 obtained after the formation of first electrode layer 11 is dipped. Porous base 10 is lifted from the solid electrolyte suspension. The solid electrolyte suspension adhering to porous base 10 is dried. Thus, ionic conductor layer 13 may be formed. It is considered that ionic conductor layer 13 is stacked on a surface of first electrode layer 11. Ionic conductor layer 13 contains the solid electrolyte.

The formation of ionic conductor layer 13 is carried out so that pores 2 of porous base 10 remain partially hollow. At this point, inner walls of pores 2 are covered with first electrode layer 11 and ionic conductor layer 13. In the hollow portions of pores 2 remaining after the formation of ionic conductor layer 13, second electrode layer 12 is formed. This procedure results in separating first electrode layer 11 from second electrode layer 12 by ionic conductor layer 13.

Second electrode layer 12 may be formed by a filtration technique, for example. For example, a negative electrode active material (or a positive electrode active material), a conductive material, a solid electrolyte, a binder, a solvent, and the like are mixed to prepare a second electrode suspension. The resulting second electrode suspension is a precursor of second electrode layer 12.

The second electrode suspension is passed through porous base 10 (which serves as a filter) that is obtained after the formation of ionic conductor layer 13. By this procedure, the hollow portions of pores 2 remaining within porous base 10 are filled with solid material (such as the active material). Thus, second electrode layer 12 may be formed. It is considered that second electrode layer 12 is stacked on a surface of ionic conductor layer 13. The solvent in the second electrode suspension is separated off as a filtrate.

Second electrode layer 12 may be formed so that it is exposed on part of an outer surface of porous base 10. After the formation of second electrode layer 12, porous base 10 is dried.

After porous base 10 is thus dried, second current collector tab 22 may be bonded to second electrode layer 12. Second current collector tab 22 may be directly bonded to second electrode layer 12. Alternatively, there may be a metal film formed between second current collector tab 22 and second electrode layer 12. For example, a thin film of gold (Au) or the like may be formed on a surface of second electrode layer 12 by deposition or other techniques and, then, to the resulting thin film, second current collector tab 22 may be welded.

After the formation of second electrode layer 12, porous base 10 is placed in housing 20. Housing 20 is described above in detail. Housing 20 is hermetically sealed. In this way, rechargeable battery 100 may be produced.

2. Case in which Ionic Conductor Layer Contains Gelled Electrolyte

When ionic conductor layer 13 contains the gelled electrolyte, rechargeable battery 100 may be produced by the following production method, for example.

For example, a positive electrode active material (or a negative electrode active material), a conductive material, a binder, a solvent, and the like are mixed to prepare a first electrode suspension. In the resulting first electrode suspension, porous base 10 is dipped. Porous base 10 is lifted from the first electrode suspension. The first electrode suspension adhering to porous base 10 is dried. Thus, first electrode layer 11 may be formed. It is considered that first electrode layer 11 is stacked on a surface of framework 1. First electrode layer 11 may be formed porous. The reason is because space may be formed between the particles (such as particles of the positive electrode active material).

For example, a polymer material may be dissolved in a solvent to prepare a polymer solution. In the resulting polymer solution, porous base 10 obtained after the formation of first electrode layer 11 is dipped. Porous base 10 is lifted from the polymer solution. The polymer solution adhering to porous base 10 is dried. Thus, a polymer layer may be formed. The resulting polymer layer is a precursor of the gelled electrolyte. It is considered that the polymer layer is stacked on a surface of first electrode layer 11.

The formation of the polymer layer is carried out so that pores 2 of porous base 10 remain partially hollow. At this point, inner walls of pores 2 are covered with first electrode layer 11 and the polymer layer. In the hollow portions of pores 2 remaining after the formation of the polymer layer, second electrode layer 12 is formed. This procedure results in separating first electrode layer 11 from second electrode layer 12 by the polymer layer. The polymer layer thus formed may have a thickness not smaller than 1 µm and not greater than 50 µm, for example. The thickness can increase if the polymer layer becomes swollen with a liquid electrolyte in a later step.

For example, a negative electrode active material (or a positive electrode active material), a conductive material, a binder, a solvent, and the like are mixed to prepare a second electrode suspension. The resulting second electrode suspension is a precursor of second electrode layer 12.

The second electrode suspension is passed through porous base 10 (which serves as a filter) that is obtained after the formation of the polymer layer. By this procedure, the hollow portions of pores 2 remaining within porous base 10 are filled with solid material. Thus, second electrode layer 12 may be formed. It is considered that second electrode layer 12 is stacked on a surface of the polymer layer. Second electrode layer 12 may be formed porous. The reason is because space may be formed between the particles (such as particles of the negative electrode active material). The solvent in the second electrode suspension is separated off as a filtrate.

Second electrode layer 12 may be formed so that it is exposed on part of an outer surface of porous base 10. After the formation of second electrode layer 12, porous base 10 is dried. After porous base 10 is thus dried, second current collector tab 22 may be bonded to second electrode layer 12. The method of bonding second current collector tab 22 is as described above.

After the formation of second electrode layer 12, porous base 10 is placed in housing 20. Into housing 20, a liquid electrolyte is injected. The liquid electrolyte is described above in detail. Housing 20 is hermetically sealed. First electrode layer 11, the polymer layer, and second electrode layer 12 are impregnated with the liquid electrolyte. Penetration of the liquid electrolyte into the polymer layer makes the polymer layer swell, and the gelled electrolyte may be formed. Thus, ionic conductor layer 13 may be formed. In other words, ionic conductor layer 13 contains the gelled electrolyte. In this way, rechargeable battery 100 may be produced.

<Uses>

Rechargeable battery 100 according to the present embodiment can be of the centimeter-scale or larger. Therefore, rechargeable battery 100 according to the present embodiment can have a practical level of capacity. In the case in which rechargeable battery 100 according to the present embodiment is a lithium-ion rechargeable battery, the battery can have a capacity not lower than 2 Ah, for example. In other words, rechargeable battery 100 according to the present embodiment is expected to have a capacity equivalent or higher than the capacity of a 18650 (diameter, 18 mm; height, 65 mm) lithium-ion rechargeable battery.

Rechargeable battery 100 according to the present embodiment, which is a three-dimensional battery, is expected to have both a high energy density and a high output. Therefore, it is considered that rechargeable battery 100 according to the present embodiment is suitable for power supplies for driving, for example, hybrid vehicles (HVs), plug-in hybrid vehicles (PHVs), and electric vehicles (EVs). It should be noted that the use of rechargeable battery 100 according to the present embodiment is not limited to vehicle-mounted applications. It is considered that rechargeable battery 100 according to the present embodiment may be used in any application.

EXAMPLES

In the following, examples according to the present disclosure are described. The scope of claims is not limited to the following description.

<Production of Rechargeable Battery>

Rechargeable battery 100 of examples was produced as follows.

<<(A) Preparation of Porous Base>>

As porous base 10, a porous nickel product (trade name, Celmet (registered trademark); product number, #4; average diameter of pores, about 900 µm) manufactured by Sumitomo Electric Industries, Ltd. was prepared. Porous base 10 has outer dimensions of 0.5 cm×0.5 cm×3.5 cm.

<<(B) Stacking>>

The following materials were prepared.

Positive electrode active material: $LiNi_{1/3}Co_{1/3}Mn_{1/3}O_2$ (powder)

Conductive material: carbon black

Binder: PVdF

Solvent: N-methyl-2-pyrrolidone (NMP)

The positive electrode active material, the conductive material, the binder, and the solvent were mixed to prepare a first electrode suspension. The mixing ratio of solid contents is "(positive electrode active material):(conductive material):binder=90.5:8:1.5 (mass ratio)". In the resulting first electrode suspension, porous base 10 was dipped. Porous base 10 was lifted from the first electrode suspension. Porous base 10 was dried. Thus, first electrode layer 11 was formed. It is considered that first electrode layer 11 is stacked on a surface of framework 1. The mass of a positive electrode composite material (first electrode layer 11) filling the interior of porous base 10 is 0.85 g.

First electrode layer 11 was formed across an area of porous base 10 having outer dimensions of 0.5 cm×0.5 cm×2 cm. To the remaining area, on which no first electrode layer 11 was formed, first current collector tab 21 was welded. First current collector tab 21 is a thin Ni plate.

A polymer solution (PVdF-HFP solution) was prepared. The solvent used in the polymer solution is NMP. In the polymer solution, porous base 10 was dipped. Porous base 10 was lifted from the polymer solution. Porous base 10 was dried. Thus, a polymer layer was formed. Preliminary experiment had been carried out to study the conditions of formation of such a polymer layer and the thickness of the resulting polymer layer, and from the results, it is considered that the polymer layer has a thickness not smaller than 5 µm and not greater than 10 µm. It is considered that the polymer layer is stacked on a surface of first electrode layer 11. After the formation of the polymer layer, pores 2 of porous base 10 remained partially hollow and the diameters of the hollow portions were about 200 µm. It is considered that at this point, inner walls of pores 2 are covered with first electrode layer 11 and the polymer layer.

The following materials were prepared.

Negative electrode active material: artificial graphite (powder; D50=about 10 µm)

Solvent: Ethanol

The negative electrode active material and the solvent were mixed to prepare a second electrode suspension. The resulting second electrode suspension was passed through porous base 10 that was obtained after the formation of the polymer layer, and second electrode layer 12 was formed. It is considered that second electrode layer 12 is stacked on a surface of the polymer layer. Second electrode layer 12 is formed so that it is partially exposed on an outer surface of porous base 10. Porous base 10 was vacuum dried at 80° C. for 12 hours. To a part of the outer surface (namely, a part with second electrode layer 12 exposed), Au was deposited to form a thin Au film. To the resulting thin Au film, second current collector tab 22 was welded. Second current collector tab 22 is a thin Ni plate.

As housing 20, an aluminum-laminated pouch was prepared. In housing 20, porous base 10 obtained after the formation of second electrode layer 12 was placed.

As the liquid electrolyte, an electrolyte solution was prepared. The electrolyte solution contains a solvent and a supporting salt specified below.

Solvent: [EC:DEC=3:7 (volume ratio)]
Supporting salt: $LiPF_6$ (1 mol/l)

The electrolyte solution was injected into housing 20. The opening of housing 20 was sealed by heat sealing. The electrolyte solution penetrated first electrode layer 11, the polymer layer, and second electrode layer 12. It is considered that penetration of the electrolyte solution into the polymer layer caused formation of a gelled electrolyte. Thus, ionic conductor layer 13 containing the gelled electrolyte was formed.

In this way, rechargeable battery 100 was produced. Rechargeable battery 100 is a three-dimensional battery of the centimeter-scale. The centimeter-scale is 10,000 times the micrometer-scale.

<Charge-Discharge Test>

A constant-current charge-discharge test was carried out at a voltage within the range from 3 V to 4.3 V and a rate of 0.2 C. The rate "0.2 C" is such a rate at which discharge of rechargeable battery 100 from its full charge capacity completes in five hours. The initial discharged capacity was 81.6 mAh. The volume of the area with the electrode thus formed (0.5 cm×0.5 cm×2 cm) and the average discharge voltage were used to calculate the energy density per volume of rechargeable battery 100. The energy density per volume of rechargeable battery 100 is 584 Wh/l. It is considered that this value is equivalent to or higher than the energy density per volume of a typical, cylindrical lithium-ion rechargeable battery (18650 size).

From these results, it is considered that the rechargeable battery according to the present disclosure is a three-dimensional battery that can be of the centimeter-scale or larger.

It is considered that as for a lithium-ion rechargeable battery having a two-dimensional electrode structure, the ratio (volume filling factor) of the volume of an active material filling the interior of housing 20 to the volume of the interior of housing 20 is about 30% to about 45%. It is considered that the rechargeable battery according to the present disclosure, which has a simple current-collecting structure and a reduced volume of the current collector and also has an active material filling the remaining space, among others, can have a volume filling factor not lower than 50%.

The embodiments and examples disclosed herein are illustrative and non-restrictive in any respect. The technical scope indicated by the claims is intended to include any modifications within the scope and meaning equivalent to the terms of the claims.

What is claimed is:

1. A rechargeable battery, comprising at least:
    a porous base;
    a first electrode layer;
    an ionic conductor layer; and
    a second electrode layer,
    the porous base comprising a framework that is conductive,
    the framework having a three-dimensional network structure,
    on at least part of a surface of the framework in the interior of the porous base, the first electrode layer, the ionic conductor layer, and the second electrode layer being stacked in this order,
    the first electrode layer and the second electrode layer having opposite polarities,
    the rechargeable battery further comprising a liquid electrolyte,
    both the first electrode layer and the second electrode layer being porous,
    the ionic conductor layer containing a gelled electrolyte,
    the liquid electrolyte having penetrated the first electrode layer, the gelled electrolyte, and the second electrode layer.

2. The rechargeable battery according to claim 1, wherein each of the first electrode layer and the second electrode layer is a fixed layer.

3. The rechargeable battery according to claim 1, wherein in a cross section in which the framework surrounds the second electrode layer, the first electrode layer and the ionic conductor layer surround the second electrode layer.

4. The rechargeable battery according to claim 1, wherein the second electrode layer is exposed on part of an outer surface of the porous base.

5. The rechargeable battery according to claim 1, wherein the rechargeable battery is a lithium-ion rechargeable battery.

6. The rechargeable battery according to claim 1, wherein the three-dimensional network structure is a gyroid structure.

7. The rechargeable battery according to claim 1, wherein the three-dimensional network structure is an inverse-opal structure.

8. A method of producing a rechargeable battery, comprising at least:
    preparing a porous base, the porous base comprising a framework that is conductive, the framework having a three-dimensional network structure; and
    on at least part of a surface of the framework in the interior of the porous base, stacking a first electrode layer, an ionic conductor layer, and a second electrode layer in this order,
    the first electrode layer and the second electrode layer having opposite polarities,
    the rechargeable battery comprising a liquid electrolyte,
    both the first electrode layer and the second electrode layer being porous,
    the ionic conductor layer containing a gelled electrolyte,
    the liquid electrolyte having penetrated the first electrode layer, the gelled electrolyte, and the second electrode layer.

9. The rechargeable battery according to claim 1, wherein each of the first electrode layer and the second electrode layer has a thickness not smaller than 2 μm and not greater than 500 μm.

10. The method of producing a rechargeable battery according to claim 8, wherein each of the first electrode layer and the second electrode layer has a thickness not smaller than 2 μm and not greater than 500 μm.

11. The rechargeable battery according to claim 1, wherein the gelled electrolyte contains a polymer material and the liquid electrolyte.

12. The method of producing a rechargeable battery according to claim 8, wherein the gelled electrolyte contains a polymer material and the liquid electrolyte.

13. The rechargeable battery according to claim 11, wherein the polymer material is at least one selected from the group consisting of polyethylene glycol, polyethylene oxide, polyvinyl alcohol, polymethyl methacrylate, polyacrylic acid, polyacrylonitrile, polyvinylidene difluoride, and vinylidene fluoride-hexafluoropropene copolymer.

14. The method of producing a rechargeable battery according to claim 12, wherein the polymer material is at least one selected from the group consisting of polyethylene glycol, polyethylene oxide, polyvinyl alcohol, polymethyl methacrylate, polyacrylic acid, polyacrylonitrile, polyvinylidene difluoride, and vinylidene fluoride-hexafluoropropene copolymer.

\* \* \* \* \*